(12) United States Patent
Chern et al.

(10) Patent No.: US 12,140,798 B2
(45) Date of Patent: Nov. 12, 2024

(54) INTEGRATED OPTICAL DEVICES AND METHODS OF FORMING THE SAME

(71) Applicant: Taiwan Semiconductor Manufacturing Company, Ltd., Hsinchu (TW)

(72) Inventors: Chan-Hong Chern, Palo Alto, CA (US); Min-Hsiang Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/358,965

(22) Filed: Jul. 26, 2023

(65) Prior Publication Data

US 2023/0367068 A1    Nov. 16, 2023

Related U.S. Application Data

(63) Continuation of application No. 17/841,694, filed on Jun. 16, 2022, now Pat. No. 11,762,147, which is a continuation of application No. 17/230,991, filed on Apr. 14, 2021, now Pat. No. 11,402,580, which is a continuation of application No. 16/524,167, filed on Jul. 29, 2019, now Pat. No. 11,009,663.

(51) Int. Cl.
*G02B 6/13* (2006.01)
*G02B 6/136* (2006.01)
*G02B 6/12* (2006.01)

(52) U.S. Cl.
CPC .... *G02B 6/136* (2013.01); *G02B 2006/12061* (2013.01); *G02B 2006/12097* (2013.01); *G02B 2006/12173* (2013.01)

(58) Field of Classification Search
CPC .......... G02B 6/136; G02B 2006/12061; G02B 2006/12097; G02B 2006/12173
USPC .......................................................... 385/131
See application file for complete search history.

(56) References Cited

U.S. PATENT DOCUMENTS

| | | | |
|---|---|---|---|
| 11,762,147 B2 * | 9/2023 | Chern ..................... | G02B 6/136 |
| | | | 385/131 |
| 2008/0266638 A1 * | 10/2008 | Shinoda .................... | H01S 5/12 |
| | | | 372/99 |
| 2019/0064439 A1 * | 2/2019 | Feshali ................... | G02B 6/136 |

* cited by examiner

*Primary Examiner* — Jerry M Blevins
(74) *Attorney, Agent, or Firm* — JCIPRNET (57) ABSTRACT

Integrated optical devices and methods of forming the same are disclosed. A method of forming an integrated optical device includes the following steps. A substrate is provided. The substrate includes, from bottom to top, a first semiconductor layer, an insulating layer and a second semiconductor layer. The second semiconductor layer is patterned to form a waveguide pattern. A surface smoothing treatment is performed to the waveguide pattern until a surface roughness Rz of the waveguide pattern is equal to or less than a desired value. A cladding layer is formed over the waveguide pattern.

20 Claims, 13 Drawing Sheets

INTEGRATED OPTICAL DEVICES AND METHODS OF FORMING THE SAME

CROSS-REFERENCE TO RELATED APPLICATION

This application is a continuation application of and claims the priority benefit of a prior application Ser. No. 17/841,694, filed on Jun. 16, 2022. The prior application Ser. No. 17/841,694 is a continuation application of and claims the priority benefit of a prior application Ser. No. 17/230,991, filed on Apr. 14, 2021. The prior application Ser. No. 17/230,991 is a continuation application of and claims the priority benefits of a prior application Ser. No. 16/524,167, filed Jul. 29, 2019. The entirety of each of the above-mentioned patent applications is hereby incorporated by reference herein and made a part of this specification.

BACKGROUND

Integrated optical devices such as waveguides are often used as components in integrated optical circuits, which integrate multiple photonic functions. The waveguides are used to confine and guide light from a first point to a second point of an integrated chip (IC) with minimal attenuation. Although the existing waveguide structures have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the critical dimensions of the various features may be arbitrarily increased or reduced for clarity of discussion.

FIG. 2 to FIG. 6 are schematic three-dimensional views of various integrated optical devices in accordance with alternative embodiments.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a second feature over or on a first feature in the description that follows may include embodiments in which the second and first features are formed in direct contact, and may also include embodiments in which additional features may be formed between the second and first features, such that the second and first features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath", "below", "lower", "on", "over", "overlying", "above", "upper" and the like, may be used herein for ease of description to describe one element or feature's relationship to another element(s) or feature(s) as illustrated in the figures. The spatially relative terms are intended to encompass different orientations of the device in use or step in addition to the orientation depicted in the figures. The apparatus may be otherwise oriented (rotated 90 degrees or at other orientations) and the spatially relative descriptors used herein may likewise be interpreted accordingly.

Figure 1A:
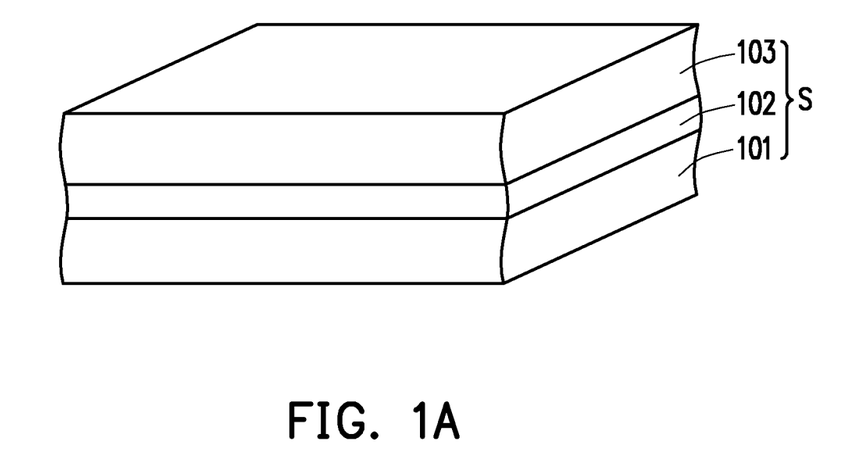
FIG. 1A to FIG. 1O are schematic three-dimensional views of a method of forming an integrated optical device in accordance with some embodiments.

FIG. 1A to FIG. 1O are schematic three-dimensional views of a method of forming an integrated optical device in accordance with some embodiments. It is understood that the disclosure is not limited by the method described below. Additional operations can be provided before, during, and/or after the method and some of the operations described below can be replaced or eliminated, for additional embodiments of the methods.

Although FIG. 1A to FIG. 1O are described in relation to a method, it is appreciated that the structures disclosed in FIG. 1A to FIG. 1O are not limited to such a method, but instead may stand alone as structures independent of the method.

Referring to FIG. 1A, a wafer or a substrate S is provided. The substrate S may be a semiconductor-on-insulator or silicon-on-insulator (SOI) substrate. For example, the substrate S includes, from bottom to top, a first semiconductor layer 101, an insulating layer 102 and a second semiconductor layer 103. The first semiconductor layer 101 may include silicon. The insulating layer 102 may include oxide, such as silicon oxide. The insulating layer 102 is referred to as a buried oxide layer or a buried insulator in some examples. The second semiconductor layer 103 may include silicon, such as single crystalline silicon. In some embodiments, the top surface of the second semiconductor layer 103 is provided with a surface roughness Rz of a few nanometers, such as about 1 to about 2 nm. In some embodiments, the surface roughness Rz is calculated by measuring the vertical distance from the highest peak to the lowest valley within a predetermined sampling length or area. In some embodiments, the top surface of the second semiconductor layer 103 has a peak-to-valley surface roughness (3-sigma) of about 0.5 nm.

The SOI substrate is widely used in silicon photonics. The second semiconductor layer 103 (e.g., crystalline silicon layer) on the insulator can be used to fabricate optical waveguides and other optical devices, either passive or active (e.g. through suitable implantations). The buried insulator enables propagation of infrared light in the silicon layer on the basis of total internal reflection. The SOI substrate may be fabricated by a silicon direct bonding or a separation by implantation of oxygen (SIMOS) method. A seed method may be applied to form the SOI substrate, in which the topmost silicon layer is grown directly on the insulator.

Figure 1B:
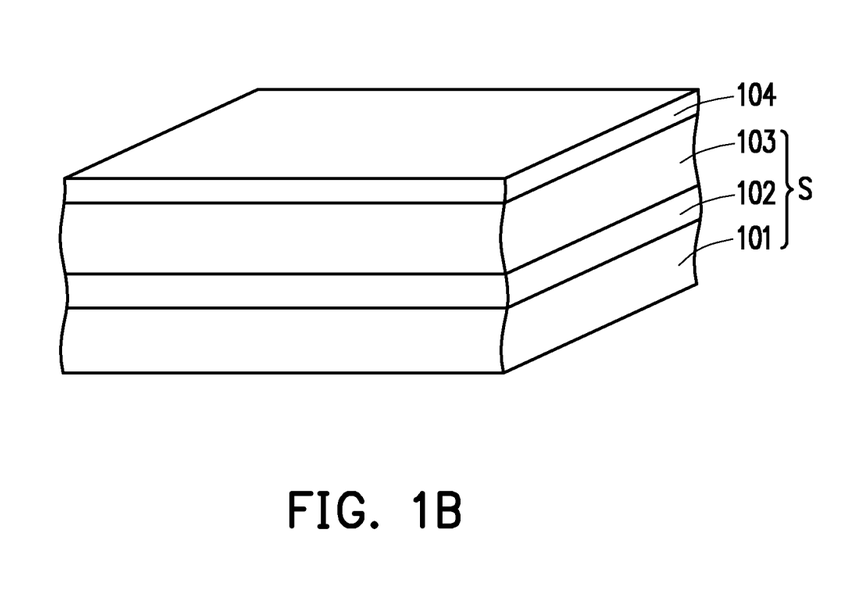

Referring to FIG. 1B, a hard mask layer 104 is formed on the substrate S. Specifically, the hard mask layer 104 is blanket formed on the top surface of the second semiconductor layer 103. In some embodiments, the hard mask layer 104 includes a material having a high etching selectivity with respect to the underlying material (e.g., silicon). For example, the hard mask layer 104 includes carbide (e.g., silicon carbide), nitride (e.g., silicon nitride), the like, or a combination thereof. For example, the hard mask layer 104 includes SiN, SiC, SiCN, SiON, SiCON or a combination thereof. The hard mask layer 104 may have a single-layer or multi-layer structure. The method of forming the hard mask layer 104 includes performing a suitable deposition process, such as a physical vapor deposition (PVD) process, a chemical vapor deposition (CVD) process, a plasma enhanced chemical vapor deposition (PE-CVD) process, an atomic layer deposition (ALD) process, or the like.

Figure 1C:
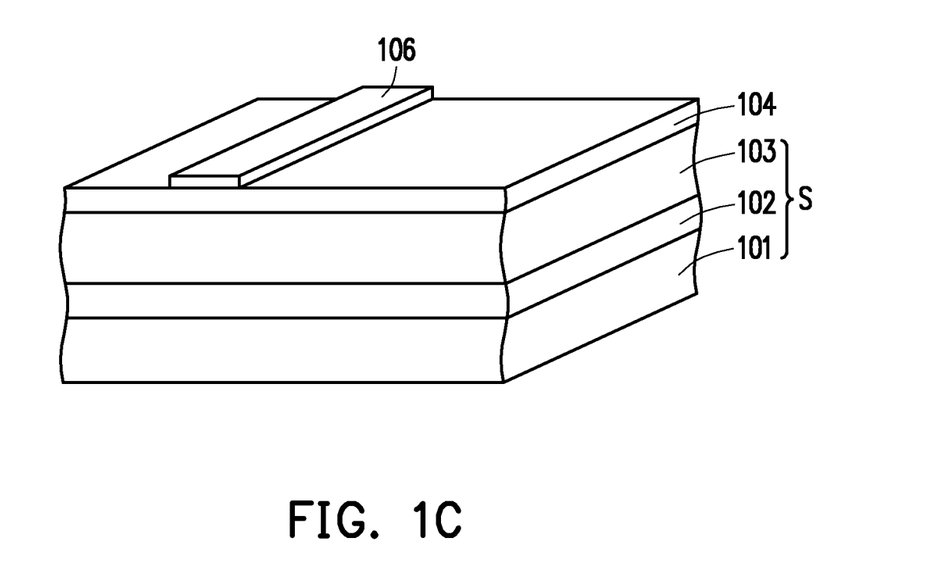

Referring to FIG. 1C, a photoresist layer 106 is formed on the hard mask layer 104. The photoresist layer 106 is configured to define the subsequently formed waveguide pattern. The photoresist layer 106 may include a photosensitive material. In some embodiments, the method of forming the photoresist layer 106 includes coating a photoresist material on the hard mask layer 104, exposing the photoresist material to a light, and developing the exposed photoresist material. The photoresist material not associated with the waveguide pattern is removed.

Figure 1D:
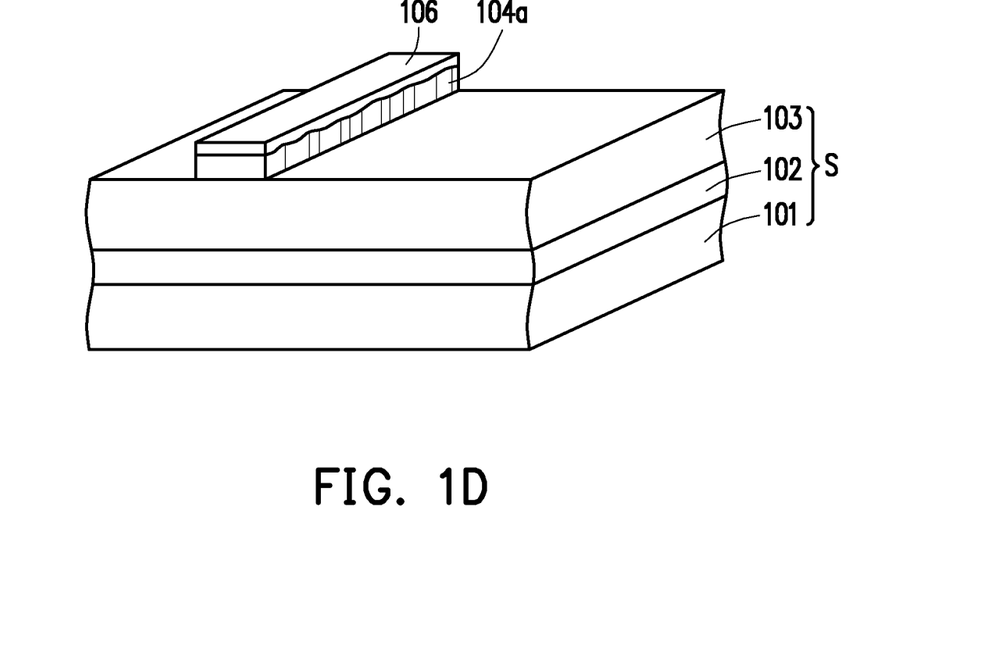

Referring to FIG. 1D, the hard mask layer 104 is patterned by using the photoresist layer 106 as a mask, so as to form a patterned hard mask layer 104a. In some embodiments, an etching process is performed by using the photoresist layer 106 as an etching mask, so as to remove a portion of the hard mask layer 104. The etching process may include an anisotropic etching process, such as a dry etching process.

Upon the steps in FIG. 1C and FIG. 1D, the pattern of the photoresist layer 106 is transferred to the hard mask layer 104. One problem in such process is that the photoresist pattern with a small width is likely to change its shape during processing. This deformation may be transferred into the layer being etched, yielding an etch profile which deviates from the intended shape, dimension or roughness. The etch-induced photoresist transformation may be classified in groups such as line edge roughening, surface roughening, and line wiggling. Line edge roughness (LER) refers to the edge of the patterned line becoming more irregular as the pattern is transferred from the photoresist layer to the underlying hard mask layer. In some embodiments, the patterned hard mask layer 104a has a line edge roughness (LER) (3 sigma) of about 5 to 10 nm.

Figure 1E:
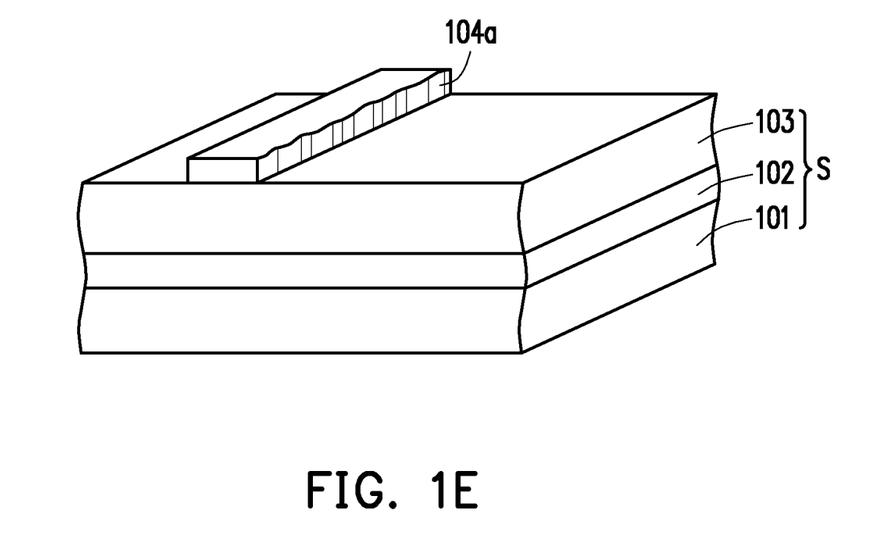

Referring to FIG. 1E, the photoresist layer 106 is removed. In some embodiments, the photoresist layer 106 is removed or stripped by a suitable process, such as a plasma ashing process, a wet dip or both.

Figure 1F:
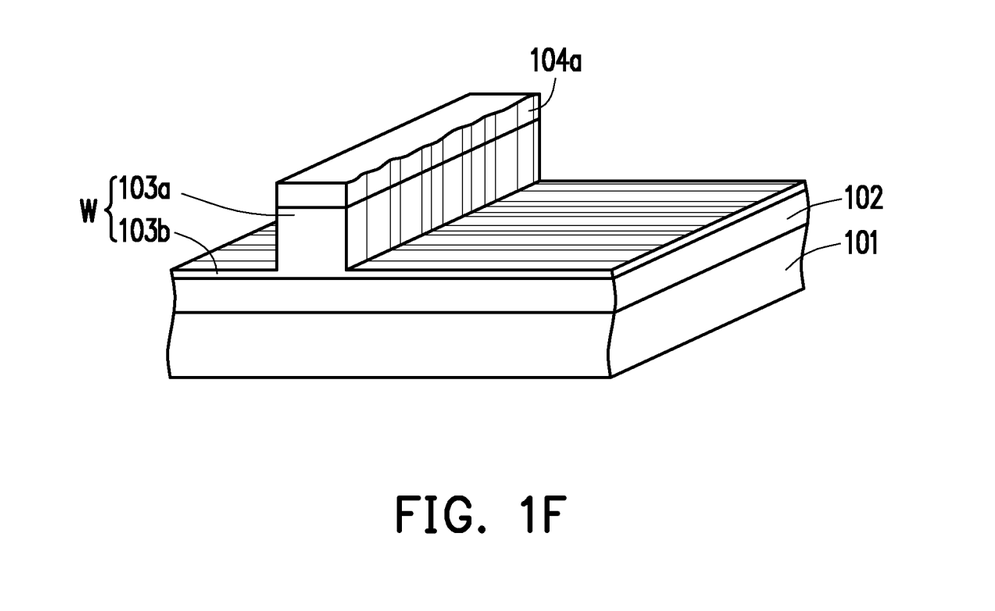

Referring to FIG. 1F, the second semiconductor layer 103 is pattered by using the patterned hard mask layer 104a as a mask, so as to form a waveguide pattern W. In some embodiments, an etching process is performed by using the patterned hard mask layer 104a as an etching mask, so as to remove a portion of the second semiconductor layer 103. The etching process may include an anisotropic etching process, such as a dry etching process. In some embodiments, the etching process does not completely etch away the second semiconductor layer 103 uncovered by the patterned hard mask layer 104a, and instead leaves a thin un-etched silicon layer over the insulating layer 102. Specifically, the step of patterning the second semiconductor layer 103 includes forming a strip portion 103a and two lining portions 103b aside the strip portion 103a. In some embodiments, the strip portion 103a has a height of about 200 nm to about 350 nm, and a width of about 300 nm to about 500 nm. In some embodiments, the height of each lining portion 103b is less than about 1/10 the height of the strip portion 103a. In some embodiments, each lining portion 103b has a height of about 30 nm or less, such as 25 nm, 20 nm, 15 nm, 10 nm or 5 nm, including any range between any two of the preceding values. The height of each lining portion 103b may be less than any one of the preceding values. In some embodiments, the height of each lining portion 103b may be approximately zero, such as from about 1 nm to about 3 nm.

In FIG. 1F, the lines schematically depicted on the strip portion 103a and the lining portions 103b are provided to indicate the degree of surface roughness. The greater the number of lines, the greater the surface roughness. The smaller the number of lines, the lesser the surface roughness. As shown in FIG. 1F, the waveguide pattern W including the strip portion 103a and the lining portions 103b is initially formed with a larger surface roughness. In some embodiments, the surface roughness Rz of the waveguide pattern W ranges from about 10 nm to about 20 nm. In some embodiments, the surface roughness Rz is calculated by measuring the vertical distance from the highest peak to the lowest valley across the sidewall of the strip portion 103a.

Figure 1G:
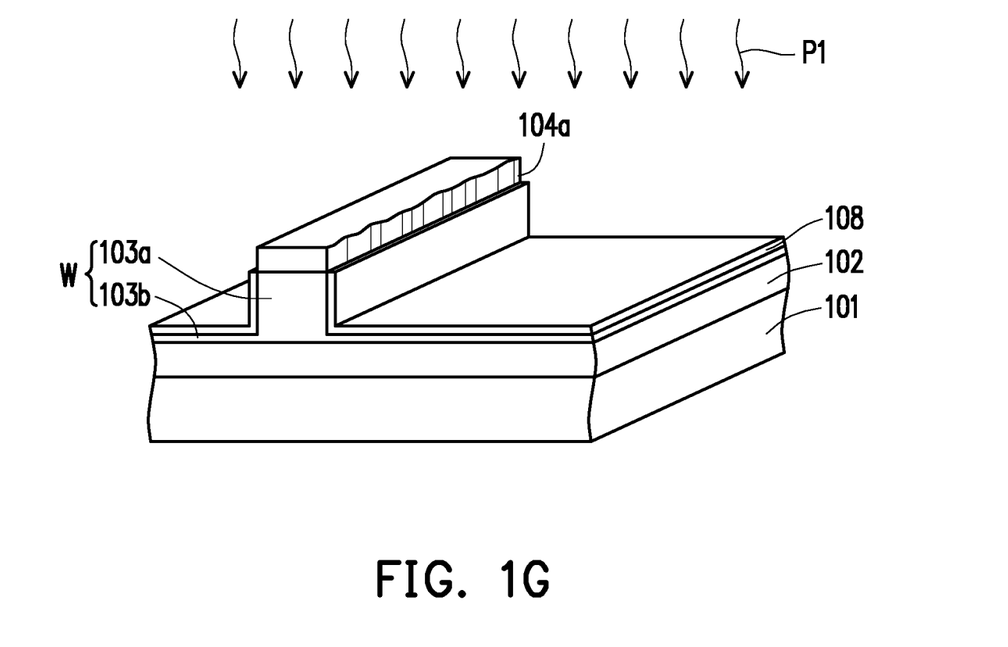

Referring to FIG. 1G, the surface of the waveguide pattern W is oxidized to form an oxide layer 108. Specifically, the oxide layer 108 is formed on the sidewall of the strip portion 103a and on the top surfaces of the lining portions 103b. In some embodiments, a thermal oxidation or an oxidizing process P1 is performed to the waveguide pattern W in a furnace at a temperature of about 700 to about 1,200 degrees Centigrade, such as from about 850 to about 950 degrees Centigrade. A rapid thermal oxidation may be utilized in some examples.

The thermal oxidation is a way to produce a thin layer of oxide (usually silicon oxide) on the surface of the waveguide pattern W. The technique forces an oxidizing agent to diffuse into a semiconductor layer at a high temperature and react with it. In some embodiments, the oxidizing agent includes oxygen ($O_2$), ozone ($O_3$), the like, or a combination thereof. The oxidizing ambient may also contain several percent of hydrochloric acid (HCl). The chlorine in hydrochloric acid removes, if any, undesired metal ions. Its presence also increases the rate of oxidation.

The oxidizing agent consumes a surface portion of the waveguide pattern W. Specifically, the oxide layer 108 grows both down into the waveguide pattern W and up out of it. Besides, silicon oxide may be grown faster for large silicon grains but slower for smaller silicon grains, and thus, the oxidizing agent consumes more for larger silicon grains but less for smaller silicon grains. In some embodiments, the thickness of the oxide layer 108 formed by the oxidizing process P1 ranges from 1 nm to 20 nm, such as 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm. 18 nm or 19 nm, including any range between any two of the preceding values. The thickness of the oxide layer 108 may be more than any one of the preceding values.

Figure 1H:
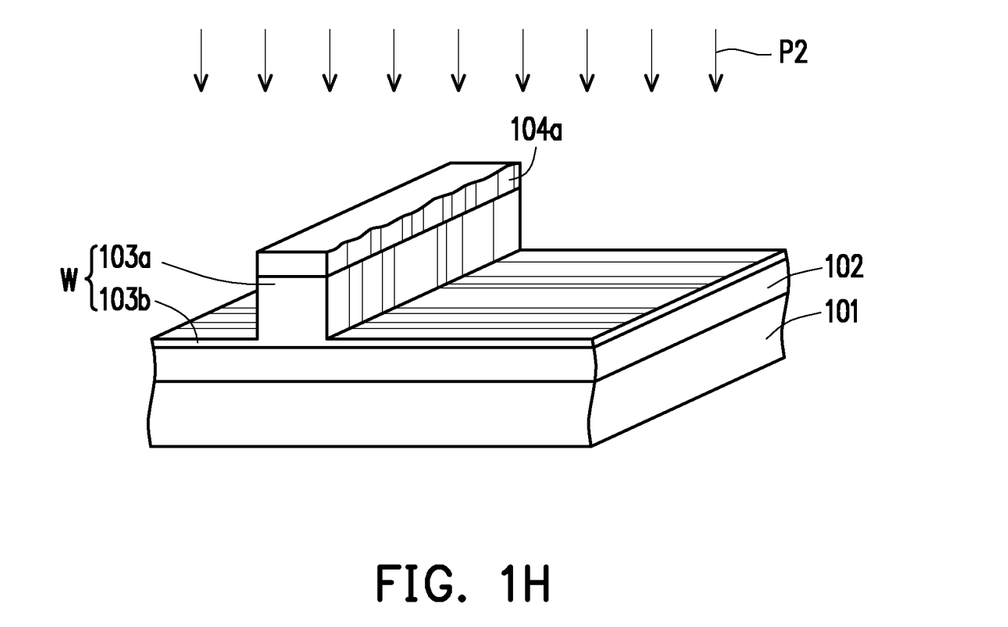

Referring to FIG. 1H, the oxide layer 108 is removed from the surface of the waveguide pattern W. In some embodiments, an etching process P2 is performed to remove the oxide layer 108 by an etching agent having a high etching selectivity with respect to the underlying material (e.g., silicon). In some embodiments, a buffered oxide etch (BOE), also known as buffered HF or BHF, is used to remove the silicon oxide layer 108. In some embodiments, the BOE is a mixture of buffering agents, such as ammonium fluoride ($NH_4F$) and hydrofluoric acid (HF). The BOE may etch away silicon oxide quickly under good process control.

The oxidizing process P1 of FIG. 1G and the etching process P2 in FIG. 1H constitute one cycle of the surface smoothing treatment. In some embodiments, upon one cycle of the surface smoothing treatment, the surface roughness of the waveguide pattern W is reduced to less than about 1/2 of its original roughness. In some embodiments, the surface roughness Rz of the waveguide pattern W after one cycle of the surface smoothing treatment ranges from about 1 nm to about 10 nm.

Figure 1I:
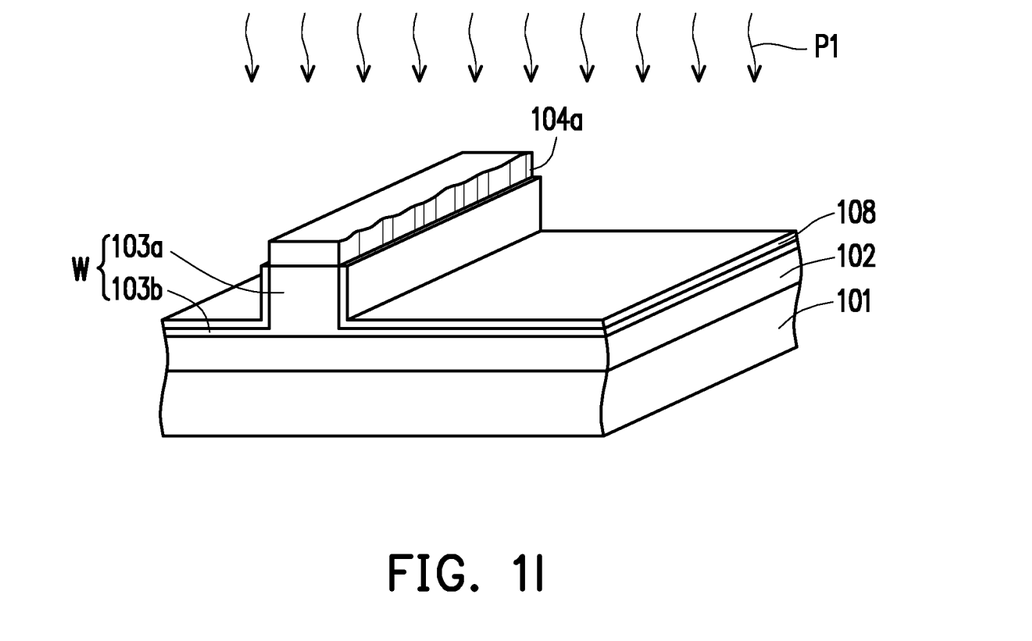
Figure 1J:
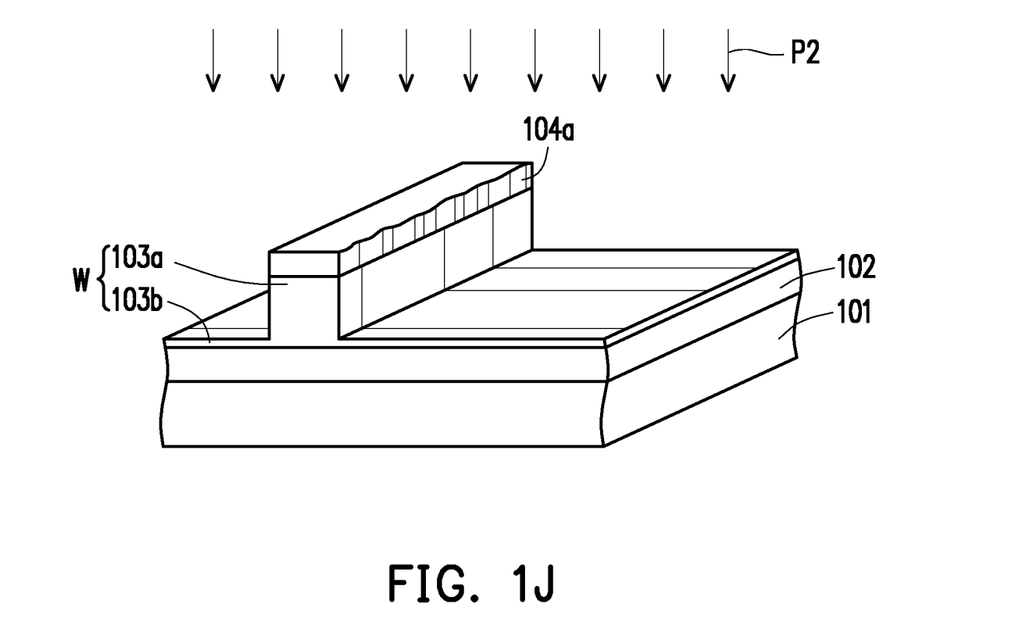

Referring to FIG. 1I and FIG. 1J, another cycle of the surface smoothing treatment is performed to the waveguide pattern W. Specifically, as shown in FIG. 1I, the surface of the waveguide pattern W is oxidized to form another oxide layer 108. The step of FIG. 1I is similar to the step of FIG. 1G, so the details are not iterated herein. Thereafter, the oxide layer 108 is removed from the surface of the waveguide pattern W. The step of FIG. 1J is similar to the step of FIG. 1H, so the details are not iterated herein. In some embodiments, upon two cycles of the surface smoothing treatment, the surface roughness of the waveguide pattern W is reduced to less than about 1/10 of its original roughness. In some embodiments, the surface roughness Rz of the waveguide pattern W after two cycles of the surface smoothing treatment ranges from about 1 nm to about 2 nm. In some embodiments, the sidewall of the strip pattern 103a of the waveguide pattern W has a peak-to-valley surface roughness (3-sigma) of about 0.5 nm or less, such as about 0.3 nm or less. In some embodiments, the waveguide pattern W has a line edge roughness (LER) (3 sigma) of about 0.5 nm or less, such as about 0.3 nm or less.

From another point of view, the oxidizing step of FIG. 1G and the etching step of FIG. 1H constitute a cycle of a cyclic oxidation and etching process. In the cyclic oxidation and etching process, an oxidizing step and an etching step are performed successively and circularly without interruption. The above embodiments in which the cyclic oxidation and etching process includes two cycles of oxidation and etching steps are provided for illustration purposes, and are not construed as limiting the present disclosure. In some embodiments, the oxidizing step of FIG. 1G and the etching step in FIG. 1H may be performed alternately as many times as needed, until the waveguide pattern W is formed with a desired surface roughness. Specifically, the cyclic oxidation and etching process may include m cycles of oxidation and etching steps, and m is a positive integer. For examples, m is an integer from 1 to 5. The cyclic oxidation and etching process are beneficial to reduce the surface roughness Rz and the line edge roughness (LER) of the waveguide pattern W.

In some embodiments, the cyclic oxidation and etching process may be performed in different chambers. However, the present disclosure is not limited thereto. In alternative embodiments, the cyclic oxidation and etching process may be performed in the same chamber as needed.

Figure 1K:
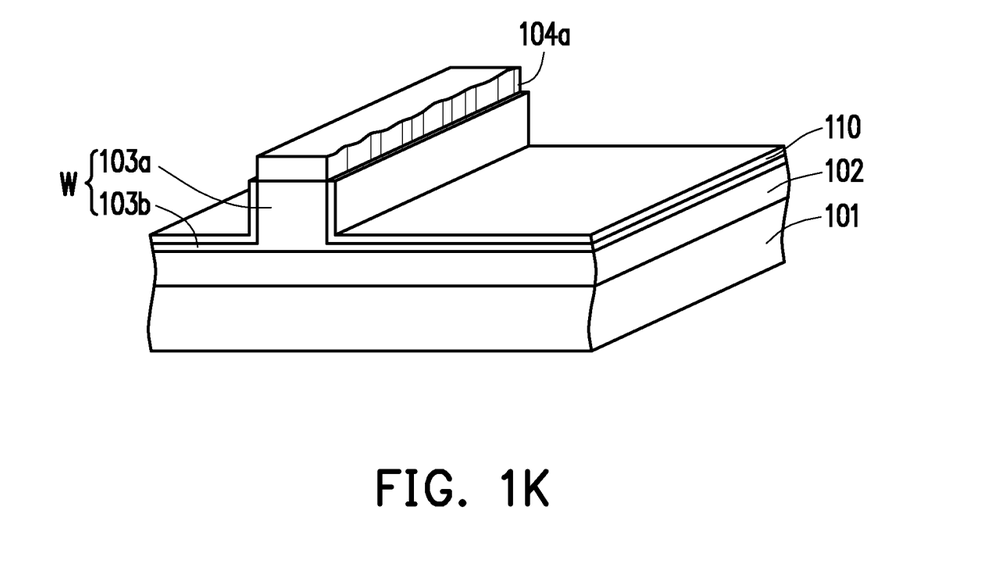

Referring to FIG. 1K, after the waveguide pattern W is formed with a desired surface roughness by the above surface smoothing treatment, a final oxide layer 110 is formed on the waveguide pattern W. Specifically, the final oxide layer 110 is formed on the sidewall of the strip portion 103a and on the top surfaces of the lining portions 103b. In some embodiments, the step of FIG. 1K is similar to the step of FIG. 1G, so the details are not iterated herein. In some embodiments, the thickness of the final oxide layer 110 formed by an oxidizing process P1 ranges from 1 nm to 20 nm, such as 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm or 19 nm, including any range between any two of the preceding values. The thickness of the final oxide layer 110 may be more than any one of the preceding values.

Figure 1L:
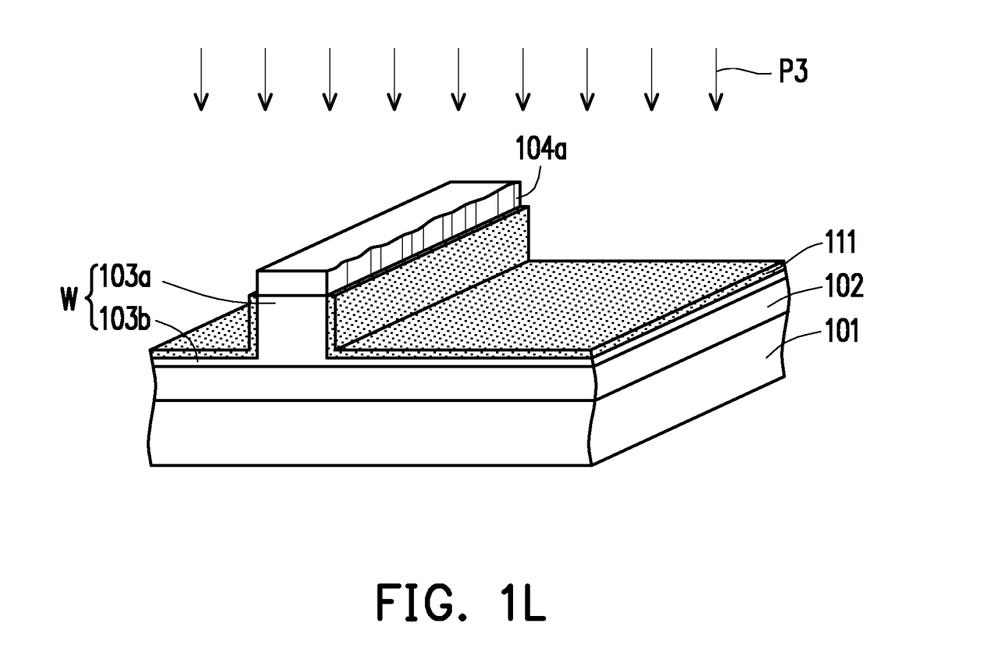

Referring to FIG. 1L, the final oxide layer 110 is optionally nitridized to form a nitrided oxide layer 111. Specifically, the nitrided oxide layer 111 is formed on the sidewall of the strip portion 103a and on the top surfaces of the lining portions 103b. The nitrided oxide layer may be referred to as a nitrided silicon oxide layer or a nitridized oxide layer in some examples. In some embodiments, a nitridizing process P3 is performed to the waveguide pattern W, so as to nitridize the oxide layer 110. The step in FIG. 1L may be referred to as a plasma nitridization or a nitrogen plasma implantation in some examples. A rapid thermal annealing may be utilized in some examples.

In some embodiments, the nitridizing process P3 includes $N_2$, $NH_3$, $NH_4$, NHx (wherein x is between 0 and 1), the like or a combination thereof. In some embodiments, the nitridizing process P3 is performed with a pure nitrogen gas. In alternative embodiments, the nitrogen-containing ambient may be diluted with an inert gas such as, for example, argon (Ar), helium (He), neon (Ne), or a mixture thereof. In some embodiments, the amount of nitrogen is greater than the amount of argon, so as to effectively nitridize the oxide layer 110. In some embodiments, the nitridizing process P3 includes argon and nitrogen, and the volume ratio of argon to the nitrogen ranges from about 1:1 to about 1:20, such as 1:2, 1:5, 1:10 or 1:15, including any range between any two of the preceding values. The volume ratio of the argon to the nitrogen may be less than any one of the preceding values.

From another point of view, notwithstanding whether the nitrogen-containing ambient is employed neat (i.e., non-diluted) or diluted, the content of nitrogen within the nitrogen-containing ambient employed in the present disclosure is typically from about 50% to 100%. The nitrided oxide layer 111 is formed by nitridizing the oxide layer 110 with the nitrogen-containing plasma. In some embodiments, the nitrided oxide layer 111 includes a nitrogen atom content of about 1-30 at %.

Figure 1M:
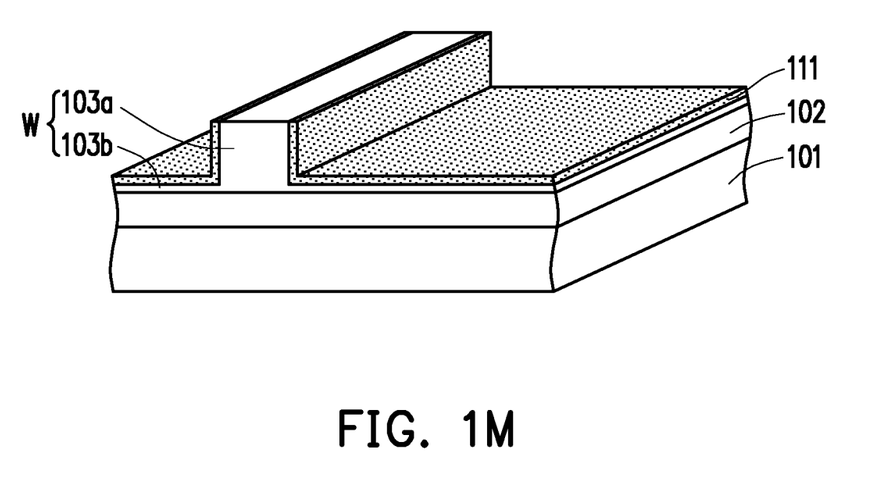

Referring to FIG. 1M, the patterned hard mask layer 104a is removed from the top surface of the waveguide pattern W. Specifically, the top surface of the strip portion 103a of the waveguide pattern W is exposed after the patterned hard mask layer 104a is removed. In some embodiments, the patterned hard mask layer 104a is removed by a suitable process, such as an etching process.

In some embodiments, the top surface of the strip portion 103a of the waveguide pattern W may be either left uncovered and exposed to air (e.g. for sensing applications). In alternative embodiments, the top surface of the waveguide pattern W may be covered with a cladding layer, which will be described in details below.

Figure 1N:
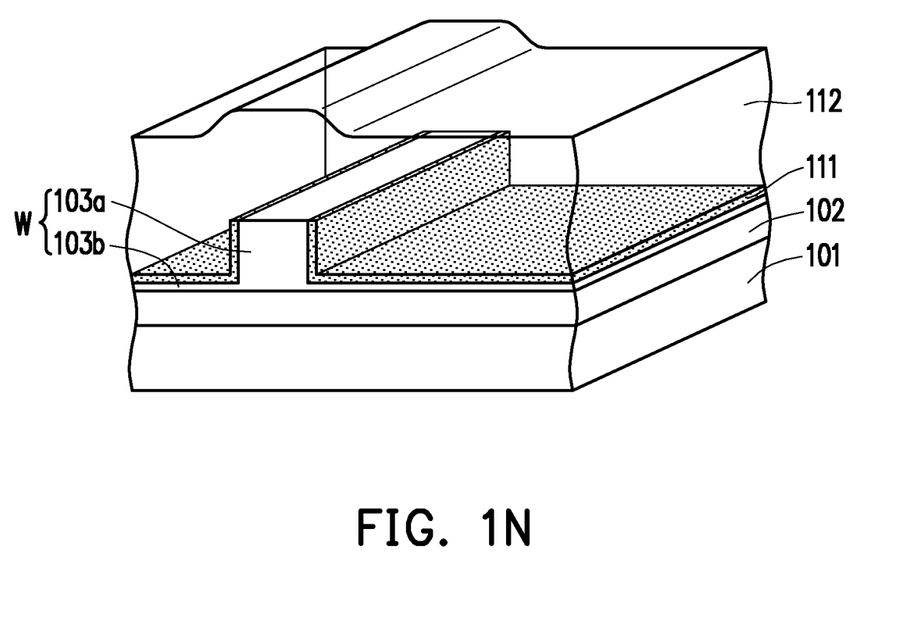

Referring to FIG. 1N, a cladding layer 112 is optionally formed over the waveguide pattern W. Specifically, the cladding layer 112 is blanket formed on the second semiconductor layer 103, covering the waveguide pattern W. In some embodiments, the cladding layer 112 includes oxide, such as silicon oxide or the like. The cladding layer 112 may have a single-layer or multi-layer structure. The method of forming the cladding layer 112 includes performing a suitable deposition process, such as a physical vapor deposition (PVD) process, a chemical vapor deposition (CVD) process, a plasma enhanced chemical vapor deposition (PE-CVD) process, an atomic layer deposition (ALD) process, or the like.

Referring to FIG. 1O, the cladding layer 112 is planarized. In some embodiments, the planarizing process includes a chemical mechanical polishing (CMP) process. An etching back process may be utilized in some examples. The cladding layer 112 has a substantially planar top surface. The integrated optical device 10 of the disclosure is thus completed.

In the above embodiments, the step of patterning the second semiconductor layer in FIG. 1F includes forming a waveguide pattern with a strip portion and two thin lining portions. However, the present disclosure is not limited thereto. In alternative embodiments, the step of patterning the second semiconductor layer in FIG. 1F may form a waveguide pattern with a different shape.

Figure 2:
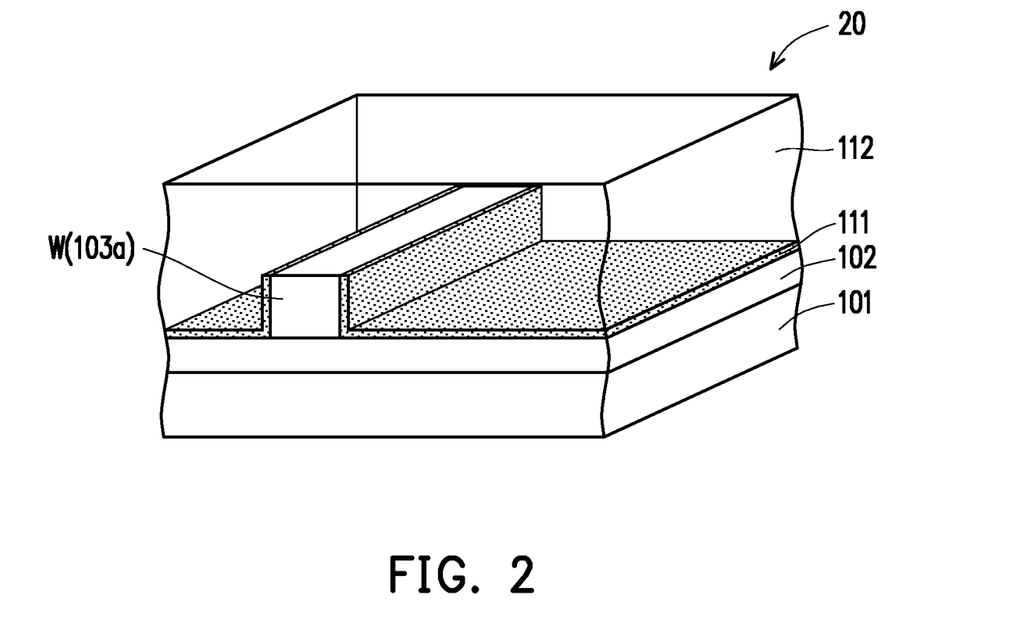

In some embodiments, the etching process of FIG. 1F completely etches away the second semiconductor layer 103 uncovered by the patterned hard mask layer 104a, and therefore exposes the underlying insulating layer 102. Specifically, the step of patterning the second semiconductor layer 103 includes forming a standalone strip portion 103a. In some embodiments, the strip portion 103a has a height of about 200 nm to about 350 nm, and a width of about 300 nm to about 500 nm. Other process steps are similar to those described above, and thus, an integrated optical device 20 of the disclosure is formed.

Each of the integrated optical devices 10 and 20 may be referred to as a strip silicon waveguide in some examples. The strip silicon waveguide of the disclosure has a smaller bending radius, and is able to significantly confine the light due to its strong refractive index contrast to its cladding layer ($n_{r\_Si}$=~3.47 vs $n_{r\_SiO2}$=~1.45). The strip silicon waveguide of the disclosure has an ultra-low surface roughness (Rz=1~2 nm), so the light transmission loss due to scattering is dramatically reduced.

Figure 3:
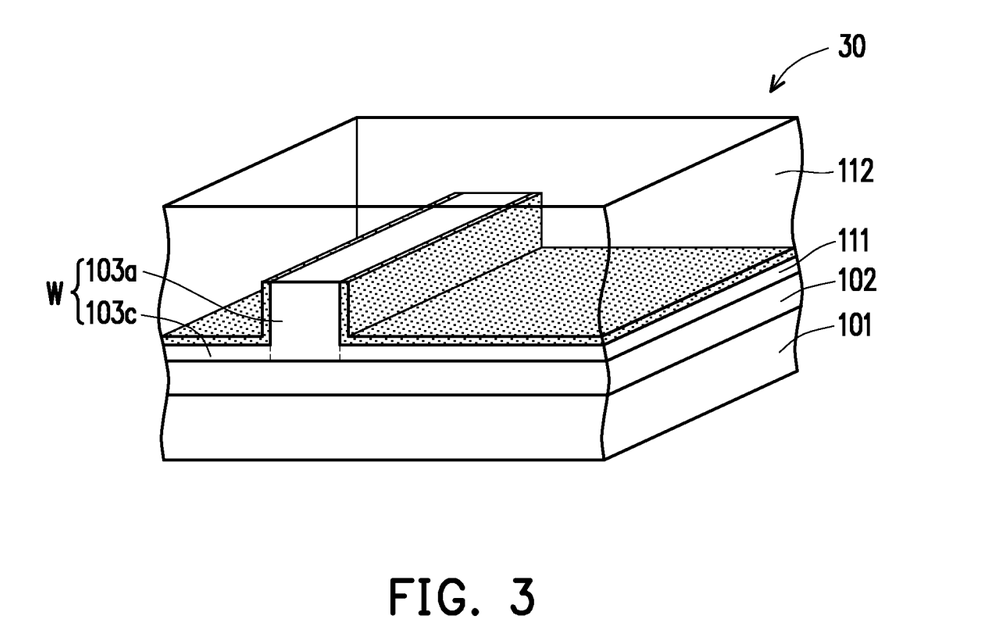

In some embodiments, the etching process of FIG. 1F does not completely etch away the second semiconductor layer 103 uncovered by the patterned hard mask layer 104a, and instead leave a thick unetched silicon layer over the insulating layer 102. Specifically, the step of patterning the second semiconductor layer 103 includes forming a strip portion 103a and two slab portions 103c aside the strip portion 103a. In some embodiments, the strip portion 103a has a height of about 200 nm to about 350 nm, and a width of about 300 nm to about 500 nm. In some embodiments, the height of each slab portion 103c is about ½-⅕ (e.g., about ⅓ to ¼) the height of the strip portion 103a. In some embodiments, each slab portion 103c has a height of about 40 nm to about 160 nm, such as about 70 nm to about 140 nm. For example, each slab portion 103c has a height of about 80 nm, 90 nm, 100 nm, 110 nm. 120 nm or 130 nm, including any range between any two of the preceding values. The height of each slab portion 103c may be less than or more than any one of the preceding values as needed. Other process steps are similar to those described above, and thus, an integrated optical device 30 of the disclosure is formed.

The integrated optical device 30 may be referred to as a rib silicon waveguide in some examples. The rib silicon waveguide needs a larger bending radius to mitigate light scape loss. Nevertheless, it is also able to achieve ultra-low surface roughness (Rz=1~2 nm), so the light transmission loss due to scattering is dramatically reduced. The rib waveguide can be utilized to form an active waveguide by doping the slab portions and connecting the doped slab portions to electrodes to modulate light propagation.

Figure 4:
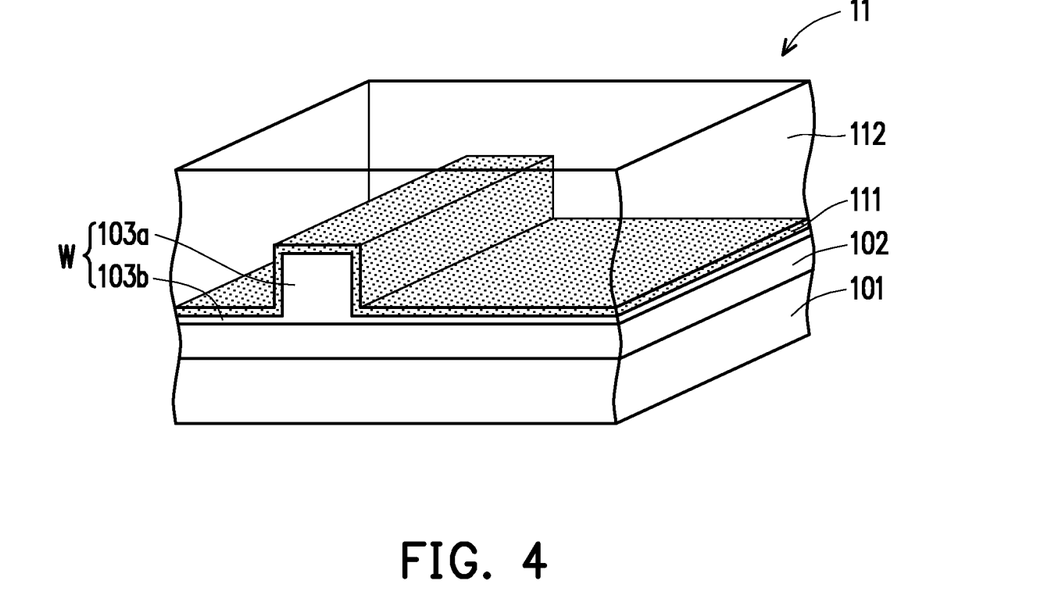
Figure 5:
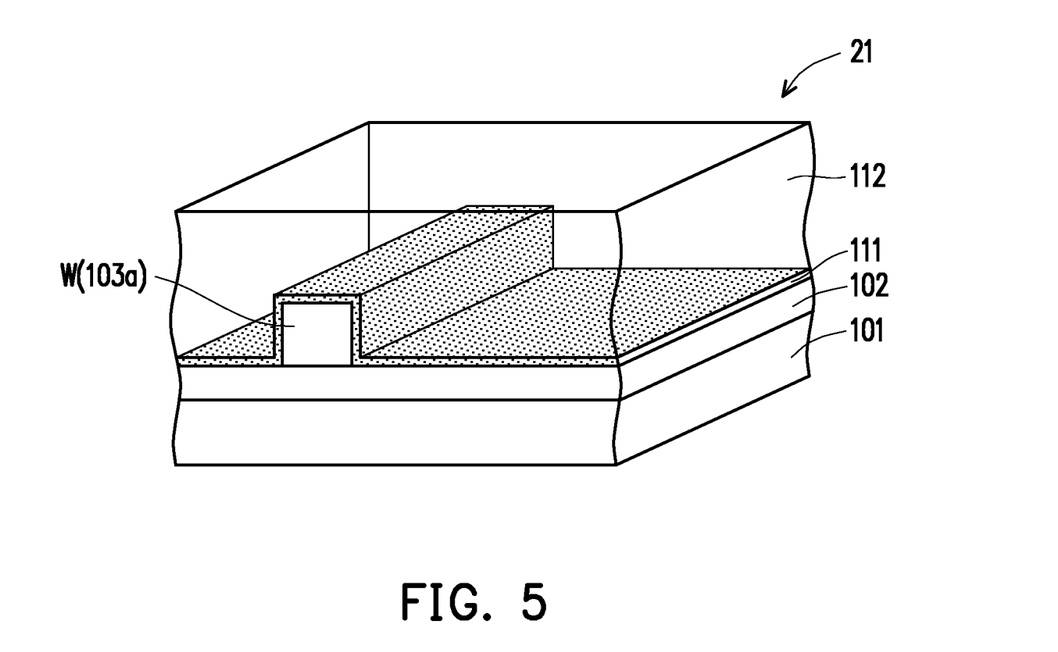
Figure 6:
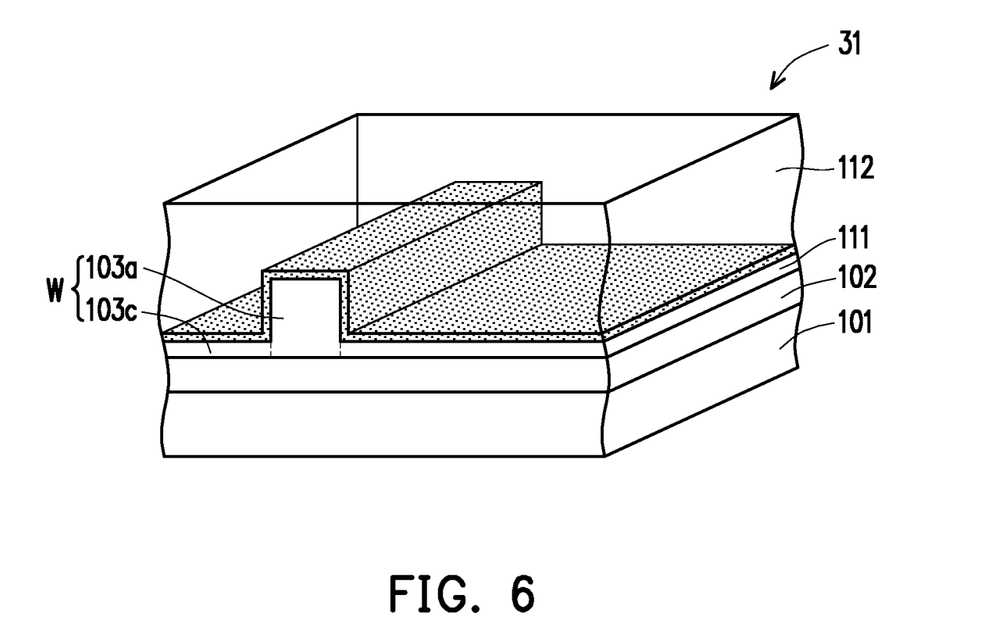

In the above methods of forming the integrated optical devices 10, 20 and 30, the step of removing the patterned hard mask layer is performed after the step of nitridizing the final oxide layer on the waveguide pattern, so the nitridizing step is performed to the sidewall of the waveguide pattern rather than the top surface of the waveguide pattern covered by the patterned hard mask layer. However, the present disclosure is not limited thereto. In alternative embodiments, the step of removing patterned hard mask layer is performed before the step of nitridizing the final oxide layer on the waveguide pattern, so the nitridizing step is performed to the sidewall and the top surface of the waveguide pattern. Other process steps are similar to those described above, and thus, integrated optical devices 11, 21 and 31 of the disclosure are formed, as shown in FIG. 4 to FIG. 6.

Figure 7:
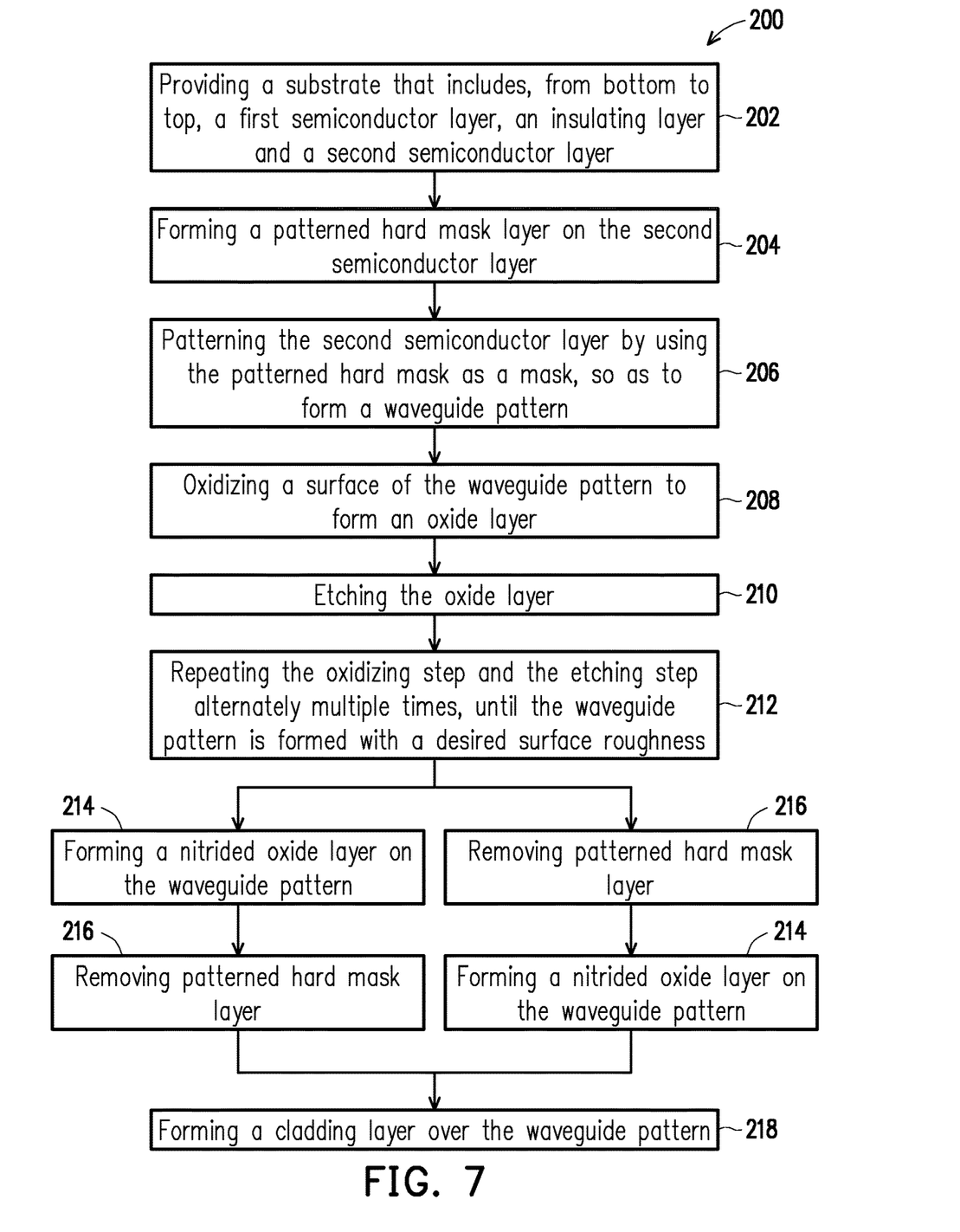
FIG. 7 is a flow chart of a method of forming an integrated optical device in accordance with some embodiments.

FIG. 7 illustrates a method 200 of forming an integrated optical device in accordance with some embodiments. Although the method 200 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 202, a substrate is provided, and the substrate includes, from bottom to top, a first semiconductor layer, an insulating layer and a second semiconductor layer. FIG. 1A illustrates a three-dimensional view corresponding to some embodiments of act 202.

At act 204, a patterned hard mask layer is formed on the second semiconductor layer. FIG. 1B to FIG. 1E illustrate three-dimensional views corresponding to some embodiments of act 204.

At act 206, the second semiconductor layer is patterned by using the patterned hard mask as a mask, so as to form a waveguide pattern. FIG. 1F illustrates a three-dimensional view corresponding to some embodiments of act 206.

At act 208, a surface of the waveguide pattern is oxidized to form an oxide layer. FIG. 1G illustrates a three-dimensional view corresponding to some embodiments of act 208.

At act 210, the oxide layer is etched. FIG. 1H illustrates a three-dimensional view corresponding to some embodiments of act 210.

At act 212, the oxidizing step and the etching step are repeated alternately multiple times, until the waveguide pattern is formed with a desired surface roughness. FIG. 1I to FIG. 1J illustrate three-dimensional views corresponding to some embodiments of act 212.

At act 214, a nitrided oxide layer is formed on the waveguide pattern. FIG. 1K to FIG. 1L illustrate three-dimensional views corresponding to some embodiments of act 214.

In some embodiments, an oxide layer is formed on the waveguide pattern, and the oxide layer is nitridized.

At act 216, the patterned hard mask layer is removed. FIG. 1M illustrates a three-dimensional view corresponding to some embodiments of act 216.

In some embodiments, act 216 is performed after act 214. However, the present disclosure is not limited thereto. The sequence of act 214 and act 216 may be exchanged as needed. In alternative embodiments, act 216 is performed before act 214.

At act 218, a cladding layer is formed over the waveguide pattern. FIG. 1N to FIG. 1O illustrate three-dimensional views corresponding to some embodiments of act 218. In some embodiments, a cladding layer is formed over the waveguide pattern, and the cladding layer is planarized.

Figure 8:
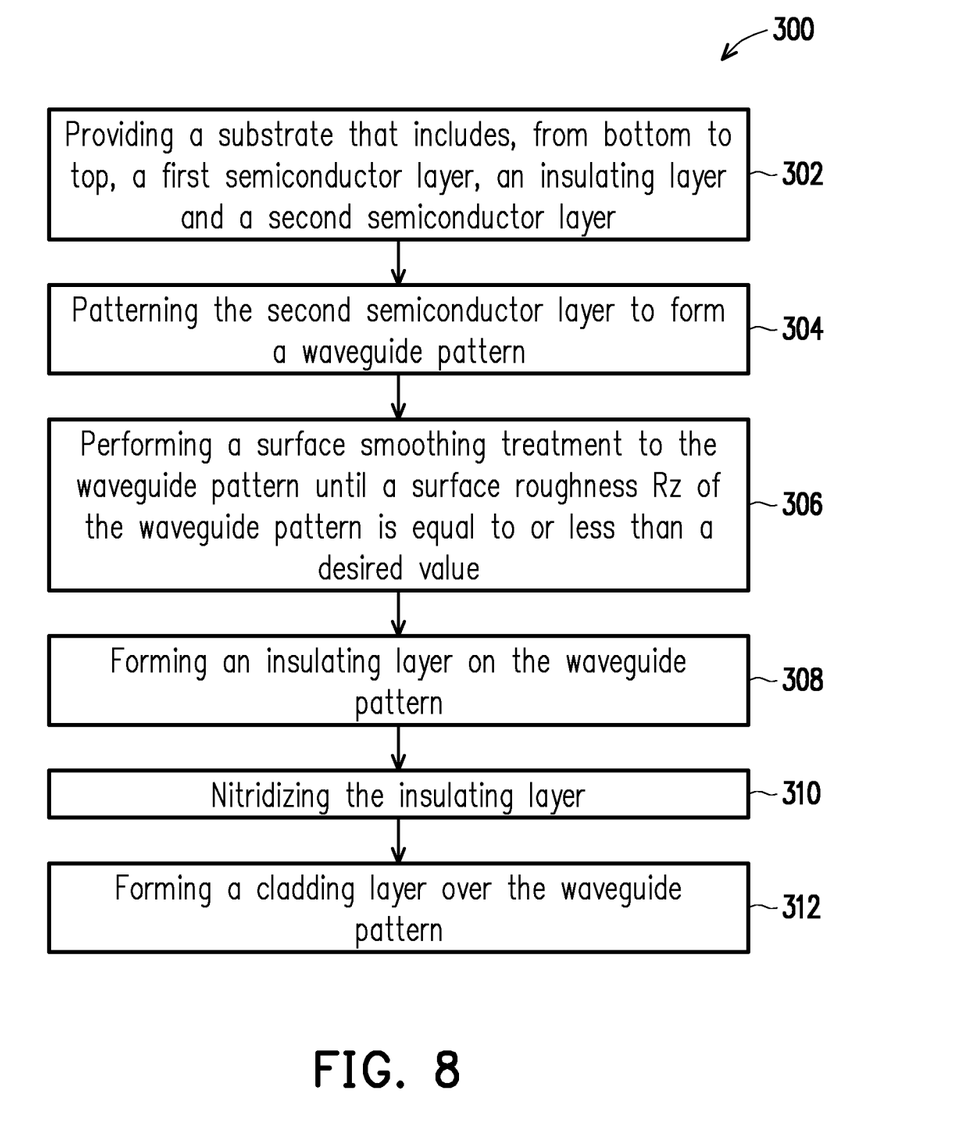
FIG. 8 is a flow chart of a method of forming an integrated optical device in accordance with some embodiments.
Figure 10:
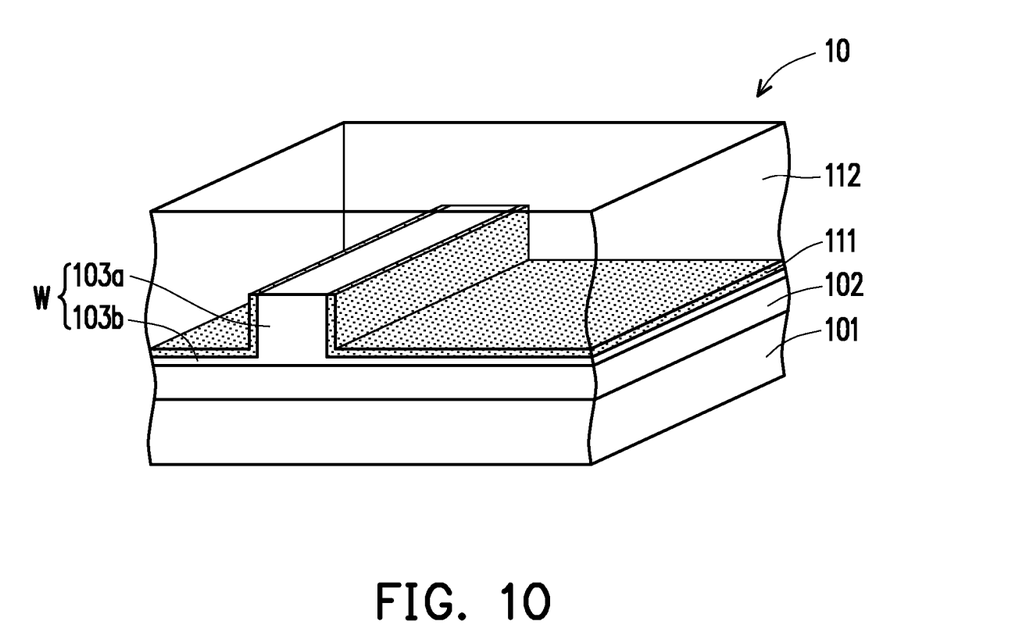

FIG. 8 illustrates a method 300 of forming an integrated optical device in accordance with some embodiments. Although the method 300 is illustrated and/or described as a series of acts or events, it will be appreciated that the method is not limited to the illustrated ordering or acts.

Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 302, a substrate is provided, and the substrate includes, from bottom to top, a first semiconductor layer, an insulating layer and a second semiconductor layer. FIG. 1A illustrates a three-dimensional view corresponding to some embodiments of act 302.

At act 304, the second semiconductor layer is patterned to form a waveguide pattern. FIG. 1B to FIG. 1F illustrate three-dimensional views corresponding to some embodiments of act 304. In some embodiments, the step of patterning the second semiconductor layer includes forming a strip portion and a lining portion aside the strip portion, as shown in FIG. 1F and FIG. 4. In some embodiments, the step of patterning the second semiconductor layer includes forming a standalone strip portion, as shown in FIG. 2 and FIG. 5. In some embodiments, the step of patterning the second semiconductor layer includes forming a strip portion and a slab portion aside the strip portion, as shown in FIG. 3 and FIG. 6.

At act 306, a surface smoothing treatment is performed to the waveguide pattern until a surface roughness Rz of the waveguide pattern is equal to or less than 2 nm. FIG. 1G to FIG. 1J illustrate three-dimensional views corresponding to some embodiments of act 306. In some embodiments, the surface smoothing treatment is performed on a sidewall of the waveguide pattern rather than on a top surface of the waveguide pattern. In some embodiments, the surface smoothing treatment includes a cyclic oxidation and etching process.

At act 308, an insulating layer is formed on the waveguide pattern. FIG. 1K illustrates a three-dimensional view corresponding to some embodiments of act 308.

At act 310, the insulating layer is nitridized. FIG. 1L illustrates a three-dimensional view corresponding to some embodiments of act 310.

At act 312, a cladding layer is formed over the waveguide pattern. FIG. 1N to FIG. 1O illustrate three-dimensional views corresponding to some embodiments of act 312.

The structures of the integrated optical devices of the disclosure are illustrated below with reference to FIG. 1O and FIG. 2 to FIG. 6.

In some embodiments, an integrated optical device 10/11/20/21/30/31 includes a waveguide pattern W. The waveguide pattern W is disposed on an insulating layer 102 and includes a strip portion 103a, and a surface roughness Rz of a sidewall of the strip portion 103a of the waveguide pattern W is equal to or less than a surface roughness Rz of a top surface of the strip portion 103a of the waveguide pattern W. In some embodiments, the surface roughness Rz of the sidewall of the waveguide pattern is equal to or less than about 2 nm, such as equal to or less than about 1 nm.

In some embodiments, the waveguide pattern W further includes a lining portion 103b aside the strip portion 103a, and the thickness of the lining portion 103b is equal to or less than about 30 nm, as shown in FIG. 1O and FIG. 4. In some embodiments, the waveguide pattern W merely includes a standalone strip portion, as shown in FIG. 2 and FIG. 5. In some embodiments, the waveguide pattern W further includes a slab portion 103c aside the strip portion 103a, and the thickness of the slab portion ranges from about 40 nm to about 160 nm, such as from about 70 nm to about 140 nm, as shown in FIG. 3 and FIG. 6.

In some embodiments, a nitrided oxide layer 111 is further included in the integrated optical device 10/11/20/21/30/31. In some embodiments, the nitrided oxide layer 111 is disposed on the sidewall of the strip portion 103a of the waveguide pattern W. In some embodiments, the nitrided oxide layer 111 is further disposed on the top surface of the lining portion 103b of the waveguide pattern W, as shown in FIG. 1O and FIG. 4. In some embodiments, the nitrided oxide layer 111 is further disposed on the top surface of the slab portion 103c of the waveguide pattern W, as shown in FIG. 3 and FIG. 6. In some embodiments, the nitrided oxide layer 111 is disposed on the top surface of the strip portion 103a of the waveguide pattern W, as shown in FIG. 4 to FIG. 6.

In some embodiments, the nitrided oxide layer 111 has a thickness of 1-20 nm. In some embodiments, the nitrided oxide layer 111 includes a nitrogen atom content of 1-30 at %, such as 5 at %, 10 at %, 15 at %, 20 at % or 25 at %, including any range between any two of the preceding values. In alternative embodiments, the nitrided oxide layer 111 may have a nitrogen atom content of greater than zero and less than any one of the preceding values. In yet alternative embodiments, the nitrided oxide layer 111 may have a nitrogen atom content of more than any one of the preceding values.

In some embodiments, a cladding layer 120 is further included in the integrated optical device 10/11/20/21/30/31. The cladding layer 120 is disposed over the waveguide pattern W. In some embodiments, the cladding layer 120 is in physical contact with the top surface of the strip portion 103a of the waveguide pattern W, as show in FIG. 1O, FIG. 2 and FIG. 3. In some embodiments, the cladding layer 120 is not in physical contact with the top surface of the strip portion 103a of the waveguide pattern W, as show in FIG. 4 to FIG. 6.

In view of the above, with the method of the disclosure, the surface roughness and the line edge roughness (LER) of the waveguide are greatly reduced, so as to provide a significantly low loss light transmission, and therefore improve the performance of the waveguide. In some embodiments, the cyclic oxidation and etching process of the disclosure is beneficial to reduce the surface roughness of the waveguide to less than $1/10$ (e.g., less than $1/20$) of its original roughness.

The above embodiments in which the surface smoothing treatment is applied to form a waveguide pattern are provided for illustration purposes, and are not construed as limiting to the present disclosure. In some embodiments, the surface smoothing treatment may be applied to form an integrated circuit pattern with low surface roughness.

In accordance with some embodiments of the present disclosure, a method of forming an integrated optical device includes the following steps. A substrate is provided. The substrate includes, from bottom to top, a first semiconductor layer, an insulating layer and a second semiconductor layer. The second semiconductor layer is patterned to form a waveguide pattern. A surface smoothing treatment is performed to the waveguide pattern until a surface roughness Rz of the waveguide pattern is equal to or less than a desired value, A cladding layer is formed over the waveguide pattern.

In accordance with alternative embodiments of the present disclosure, a method of forming an integrated optical device includes the following steps. A substrate is provided, and the substrate includes, from bottom to top, a first semiconductor layer, an insulating layer and a second semiconductor layer. A patterned hard mask layer is formed on the second semiconductor layer. The second semiconductor layer is patterned by using the patterned hard mask as a mask, so as to form a waveguide pattern. A surface of the waveguide pattern is oxidized to form an oxide layer. The oxide layer is etched. The oxidizing step and the etching step are repeated alternately multiple times, until the waveguide pattern is formed with a desired surface roughness.

In accordance with yet alternative embodiments of the present disclosure, an integrated optical device includes a waveguide pattern, a nitrided oxide layer and a cladding layer. The waveguide pattern is disposed on an insulating layer and includes a strip portion, and a surface roughness Rz of a sidewall of the strip portion of the waveguide pattern is equal to or less than a surface roughness Rz of a top surface of the strip portion of the waveguide pattern. The nitrided oxide layer is disposed on the sidewall of the strip portion of the waveguide pattern. The cladding layer is disposed over the waveguide pattern.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated optical device, comprising:
   providing a substrate;
   forming a waveguide strip on the substrate and a mask pattern on a top surface of the waveguide strip;
   performing a cyclic oxidizing and etching process multiple times to a sidewall of the waveguide strip; and
   forming a nitrided oxide layer on the top surface and the sidewall of the waveguide strip,
   wherein the method further comprises removing the mask pattern after forming the nitrided oxide layer.

2. The method of claim 1, wherein the substrate is an insulating substrate.

3. The method of claim 1, wherein the waveguide strip is in contact with the substrate.

4. The method of claim 1, further comprising forming a cladding layer on the nitrided oxide layer.

5. The method of claim 4, wherein the cladding layer is in contact with the nitrided oxide layer.

6. The method of claim 1, wherein during the step of forming the waveguide strip, a waveguide slab is simultaneously formed aside the waveguide strip and extends along a top surface of the substrate.

7. The method of claim 1, wherein the nitrided oxide layer further covers an interface between the waveguide strip and the substrate.

8. A method of forming an integrated optical device, comprising:
   providing a substrate;
   forming a waveguide pattern and a mask pattern on the substrate, wherein the waveguide pattern comprises a strip portion and a slab portion extending laterally from the strip portion, and the mask pattern is disposed on a top surface of the strip portion, wherein a surface roughness Rz of a sidewall of the strip portion is substantially equal to a surface roughness Rz of a top surface of the slab portion;
   forming an insulating layer on the sidewall of the strip portion and on the top surface of the slab portion; and
   nitridizing the insulating layer to form a nitrided oxide layer.

9. The method of claim 8, wherein the step of forming the waveguide pattern and the mask pattern comprises:
   forming a semiconductor layer on the substrate;
   forming the mask pattern on the semiconductor layer; and
   patterning the semiconductor layer by using the mask pattern as a mask.

10. The method of claim 8, further comprising, after the step of forming the waveguide pattern and the mask pattern and before the step of forming the insulating layer,
    oxidizing a surface of the waveguide pattern to form an oxide layer;
    etching the oxide layer; and
    repeating the oxidizing step and the etching step alternately multiple times.

11. The method of claim 8, further comprising removing the mask pattern after forming the nitrided oxide layer.

12. The method of claim 8, further comprising,
    forming a cladding layer over the waveguide pattern; and
    planarizing the cladding layer.

13. An integrated optical device, comprising:
    a waveguide pattern, disposed on an insulating layer, wherein the waveguide pattern comprises a strip portion and a slab portion extending laterally from the strip portion, wherein a sidewall of the strip portion of the waveguide pattern is smoother than a top surface of the strip portion of the waveguide pattern;
    a cladding layer, disposed over the waveguide pattern; and
    a nitrided oxide layer, disposed between and in contact with the waveguide pattern and the cladding layer,
    wherein a surface roughness Rz of the sidewall of the strip portion is substantially equal to a surface roughness Rz of a top surface of the slab portion.

14. The integrated optical device of claim 13, wherein the nitrided oxide layer is disposed on the sidewall of the strip portion and the top surface of the slab portion.

15. The integrated optical device of claim 14, wherein the nitrided oxide layer is further disposed on a top surface of the strip portion.

16. The integrated optical device of claim 13, wherein the slab portion has a thickness from about 40 nm to about 160 nm.

17. The integrated optical device of claim 13, wherein the surface roughness Rz of the sidewall of the strip portion is equal to or less than about 2 nm.

18. The integrated optical device of claim 13, wherein waveguide pattern is in contact with the insulating layer.

19. The integrated optical device of claim 13, wherein the nitrided oxide layer has a thickness of 1-20 nm.

20. The integrated optical device of claim 13, wherein from a top view, the cladding layer is overlapped with waveguide pattern and the nitrided oxide layer.

* * * * *